US009042129B2

(12) United States Patent
Wijekoon et al.

(10) Patent No.: US 9,042,129 B2
(45) Date of Patent: May 26, 2015

(54) SYSTEM AND METHOD FOR CONTROLLING POWER IN A DISTRIBUTION SYSTEM

(71) Applicant: General Electric Company, Schenectady, NY (US)

(72) Inventors: Pinwan Thiwanka Bandara Wijekoon, Munich (DE); Ara Panosyan, Munich (DE); Manoj Ramprasad Shah, Latham, NY (US)

(73) Assignee: General Electric Company, Niskayuna, NY (US)

( * ) Notice: Subject to any disclaimer, the term of this patent is extended or adjusted under 35 U.S.C. 154(b) by 226 days.

(21) Appl. No.: 13/678,052

(22) Filed: Nov. 15, 2012

(65) Prior Publication Data
US 2014/0133185 A1 May 15, 2014

(51) Int. Cl.
*H02J 3/36* (2006.01)
*H02M 3/335* (2006.01)
*H02J 3/00* (2006.01)

(52) U.S. Cl.
CPC .............. *H02M 3/335* (2013.01); *H02J 3/00* (2013.01); *Y02E 40/30* (2013.01)

(58) Field of Classification Search
CPC ... H02M 5/4585; H02M 5/458; H02M 7/068; H02H 11/00; H02H 9/001; H01H 9/061; H02J 9/06
USPC .......... 323/205, 206, 207; 363/34, 35, 37, 51, 363/64, 65, 171; 307/58, 82
See application file for complete search history.

(56) References Cited

U.S. PATENT DOCUMENTS

| 4,001,665 | A | * | 1/1977 | Wisner et al. ................... 363/93 |
| 5,166,597 | A | * | 11/1992 | Larsen et al. ................ 323/215 |
| 5,329,222 | A | * | 7/1994 | Gyugyi et al. ............... 323/207 |
| 5,469,044 | A | * | 11/1995 | Gyugyi et al. ............... 323/207 |
| 5,754,035 | A | * | 5/1998 | Sen ................................ 323/207 |
| 5,883,796 | A | * | 3/1999 | Cheng et al. ................... 363/40 |
| 6,021,035 | A | * | 2/2000 | Larsen et al. ................... 361/54 |
| 6,172,488 | B1 | * | 1/2001 | Mizutani et al. ............. 323/207 |

(Continued)

FOREIGN PATENT DOCUMENTS

| CN | 101695782 A | 4/2010 |
| CN | 201742617 | 2/2011 |

(Continued)

OTHER PUBLICATIONS

R.S. Weissbach et al., "A Combined Uninterruptible Power Supply and Dynamic Voltage Compensator Using a Flywheel Energy Storage System," IEEE Transactions on Power Delivery, vol. 16, No. 2, Apr. 2001, pp. 265-270.

(Continued)

*Primary Examiner* — Jue Zhang
*Assistant Examiner* — Alex Torres-Rivera
(74) *Attorney, Agent, or Firm* — Nitin N. Joshi

(57) ABSTRACT

An integrated power quality control system includes a transformer with a primary winding, a secondary winding and a compensation winding wound on a magnetic core. A power electronic converter in the system provides a reference voltage to the compensation winding for injecting a series voltage in the secondary winding of the transformer. A controller is utilized to generate a reference control voltage for the power electronic converter based on a power quality control requirement.

19 Claims, 6 Drawing Sheets

(56) References Cited

U.S. PATENT DOCUMENTS

| | | | | |
|---|---|---|---|---|
| 6,327,162 | B1* | 12/2001 | Larsen et al. | 363/51 |
| 6,633,092 | B2* | 10/2003 | Dahler et al. | 307/100 |
| 2009/0224729 | A1* | 9/2009 | Li et al. | 323/207 |
| 2009/0279328 | A1* | 11/2009 | Jiang-Hafner | 363/35 |
| 2010/0171472 | A1* | 7/2010 | Angquist | 323/207 |
| 2010/0201338 | A1* | 8/2010 | Haj-Maharsi et al. | 323/305 |
| 2012/0134191 | A1* | 5/2012 | Yoneda | 363/131 |

FOREIGN PATENT DOCUMENTS

| | | |
|---|---|---|
| JP | 2005341668 A | 12/2005 |
| JP | 2006134924 A | 5/2006 |

OTHER PUBLICATIONS

K. Haddad et al., "Distribution System Voltage Regulation Under Fault Conditions Using Static Series Regulators," IEEE Industry Applications Society, Oct. 5-9, 1997, pp. 1383-1389.

C.A. Smith et al., "Improvement in the Performance of On-Load Tap Changer Transformers Operating in Series," IEEE Power Engineering Society, vol. 3, Jul. 13-17, 2003, pp. 1905-1910.

J.S. Kim et al., "Analysis on fault current limiting and bus-voltage sag suppressing operations of SFCLs using magnetic coupling of two coils according to their application locations in a power distribution system," Elsevier, Physica C, vol. 471, 2011, pp. 1358-1363.

* cited by examiner

SYSTEM AND METHOD FOR CONTROLLING POWER IN A DISTRIBUTION SYSTEM

BACKGROUND

Embodiments of the system relate generally to an electric power grid and more specifically to power quality in a distribution network.

The basic structure of an electric power system comprises various hardware elements such as generators, transformers, and real-time monitoring equipment, and software such as power flow analysis software, fault detection software, and restoration software for generation, transmission, and distribution of electricity.

With increased distributed generation, the integration of distributed generators into existing power systems presents technical challenges such as voltage regulation, stability, and power quality issues. Power quality is an essential customer-focused measure and is greatly affected by the operation of a distribution and transmission network.

In general, power system operators ensure the quality of the power supplied to the customers by maintaining the load bus voltages within their permissible limits. Any changes to the system configuration or in power demands can result in higher or lower voltages in the system. In some situations the variability of the voltage level can be improved by reallocating the reactive power generated in the system such as by adjusting transformer taps and by switching volt-ampere reactive (VAR) sources such as capacitor banks. Another option is to use a series transformer to adjust the feeder voltages. However, transformer taps have limitations on the number of switchings per year and is not a satisfactory solution for frequent voltage variations. Furthermore, capacitor banks and the series transformer tend to require separate installations and may not work adequately for a lower reactance to resistance (X/R) ratio. Further the series transformer requires breaking the feeder line for installation.

For these and other reasons, there is a need for an improved power quality control system.

BRIEF DESCRIPTION

In accordance with an embodiment of the present invention an integrated power quality control system is provided. The system includes a transformer including a primary winding, at least one secondary winding and at least one compensation winding wound on a magnetic core. The system further includes a power electronic converter providing a reference voltage to the compensation winding for injecting a series voltage in the secondary winding and a controller to generate a reference control voltage for the power electronic converter based on a power quality control requirement.

In accordance with another embodiment of the present invention a method of controlling power to a load is provided. The method includes providing a transformer including a primary winding, at least one secondary winding and at least one compensation winding wound on a magnetic core and generating a reference control voltage for a power electronic converter based on a power quality control requirement. The method further includes utilizing the power electronic converter to provide a reference voltage across the compensation winding for injecting a series voltage in the secondary winding.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The embodiments described herein are directed to an integrated power quality control system that utilizes a distribution transformer with an active compensation winding therein to compensate for voltage fluctuations. While embodiments of the integrated power quality control system will be described in the context of the distribution transformer and for voltage fluctuations, it will be appreciated by those skilled in the art that the integrated power quality control system can be used with other transformers such as transmission transformer and for other applications such as a harmonic compensation as well.

A power system typically comprises of three stages, namely i) generation, ii) transmission and iii) distribution. Power is generated typically in the range of 1 kV to 30 kV and then transmitted at higher voltage such as 230 kV-765 kV to a distribution station. At the distribution station the voltage is again reduced to various levels in the range of 120 volts to 35 kV depending on the customer type. A number of transformers are utilized to transform/change the voltage levels from generating stations before it reaches the customers.

Figure 1A:
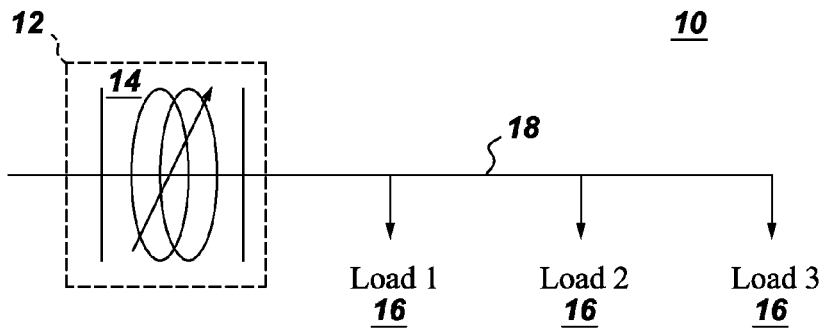
FIG. 1a is a single line diagram of a distribution system.
Figure 1B:
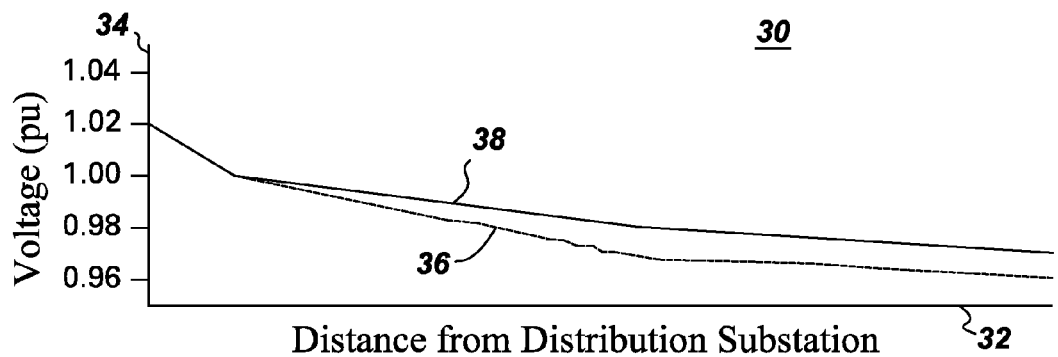
FIG. 1b illustrates the effect of voltage drop based on the distance from the distribution sub-station.

FIG. 1a illustrates a single line diagram of a distribution system 10 and FIG. 1b shows a simulation result representing corresponding graphical plot 30 of voltages at various load points in distribution system 10. The distribution system 10 includes a distribution substation 12 having a distribution transformer 14 and loads 16 connected to a feeder 18. The distribution substation 12 may receive power from one or more transmission substations (not shown). Distribution transformer 14 may be a three phase transformer or a single phase transformer depending on type of load 16 i.e., industrial or residential. Distribution system 10 may further include a pole mounted distribution transformer (not shown) connected to feeder 18 to supply power to loads 16.

Graphical plot 30 is a simulation result and shows two graphs 36, 38 for a high load period and a low load period respectively. A horizontal axis 32 in plot 30 represents a distance of the loads 16 from distribution substation 12 and a vertical axis 34 represents voltage at the load point on feeder 18. The feeder 18 has some amount of impedance per unit length (Z) which causes a voltage drop IZ volts per unit length, where I is the current flowing in the feeder. Thus, loads 16 connected along the length of the feeder 18 will have different voltage levels, and the load at the far-end of the feeder 18 has the lowest voltage. As can be seen from plot 38, the voltage at the distribution substation end 12 of the feeder is 1.02 pu. However, the voltage at feeder far-end for the corresponding Load 3 is about 0.97 pu (e.g., residential customers would be seeing about 116 volts instead of 120). If the load were to increase, the far-end voltage would drop to an even lower value (i.e., from 1.02 pu to 0.96 pu) as can be seen from graph 36.

Another reason for load voltage fluctuation is variation in active and reactive power supplied by distributed generation such as solar and wind. For example, in one embodiment, solar power generation may be located at far end of feeder 18. In such a case, a load variation may occur at center of the feeder. As a result, the system should regulate the voltage along the feeder 18 in either direction for variations in load and distributed generations.

Figure 2:
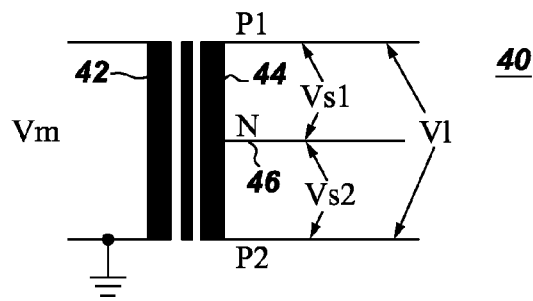
FIG. 2 is a schematic representation of a pole mounted distribution transformer.

FIG. 2 shows a schematic diagram of a pole mounted distribution transformer 40 which supplies power to residential houses. Pole mounted distribution is a term that includes pole mounted distribution transformers, underground distribution transformers, as well as any comparable distribution system that is used to supply power to at least one load source such as residential houses, businesses, government offices, schools, and any combination thereof. Pole mounted distribution transformer 40 includes a primary winding 42 which receives power from distribution substation 12 (FIG. 1) typically at a medium voltage Vm. A secondary winding 44 of pole mounted distribution transformer 40 is a split phase winding. In this example, secondary winding 44 is split into two parts by a center tap 46 of secondary winding 44. The rated voltage across secondary windings terminals P1 and P2 is generally a low voltage V1, which is less than the medium voltage Vm. In one embodiment, the medium voltage Vm may be 7200 volts and low voltage may be 240 volts. The center tap 46 provides three wires on the secondary side. The three wires on the secondary side are a center tap N at, a secondary winding terminal P1 is at Vs1 volts with respect to center tap N, and another secondary winding terminal P2 is at Vs2 volts with respect to center tap N. In general, V1 is equal to the summation of of Vs1 and Vs2.

A load can be connected between terminals P1 and N for voltage output Vs1, between terminals P2 and N for Vs2 voltage output, and a V1 volts connection is obtained by connecting the load across the terminals P1 and P2. It should be understood that as the voltage across any of these terminals varies, loads connected to these terminals are affected. For example, lights may glow brighter or dimmer, and can even cause incandescent bulbs to blow prematurely. Poor power supply can also cause electronic equipment to fail (especially computers) and may cause interference of radio or television reception. In accordance with an embodiment of the present system, a compensation winding is included in transformer 40 to regulate output voltage of the transformer 40 so that customers can receive high quality power supply.

Figure 3:
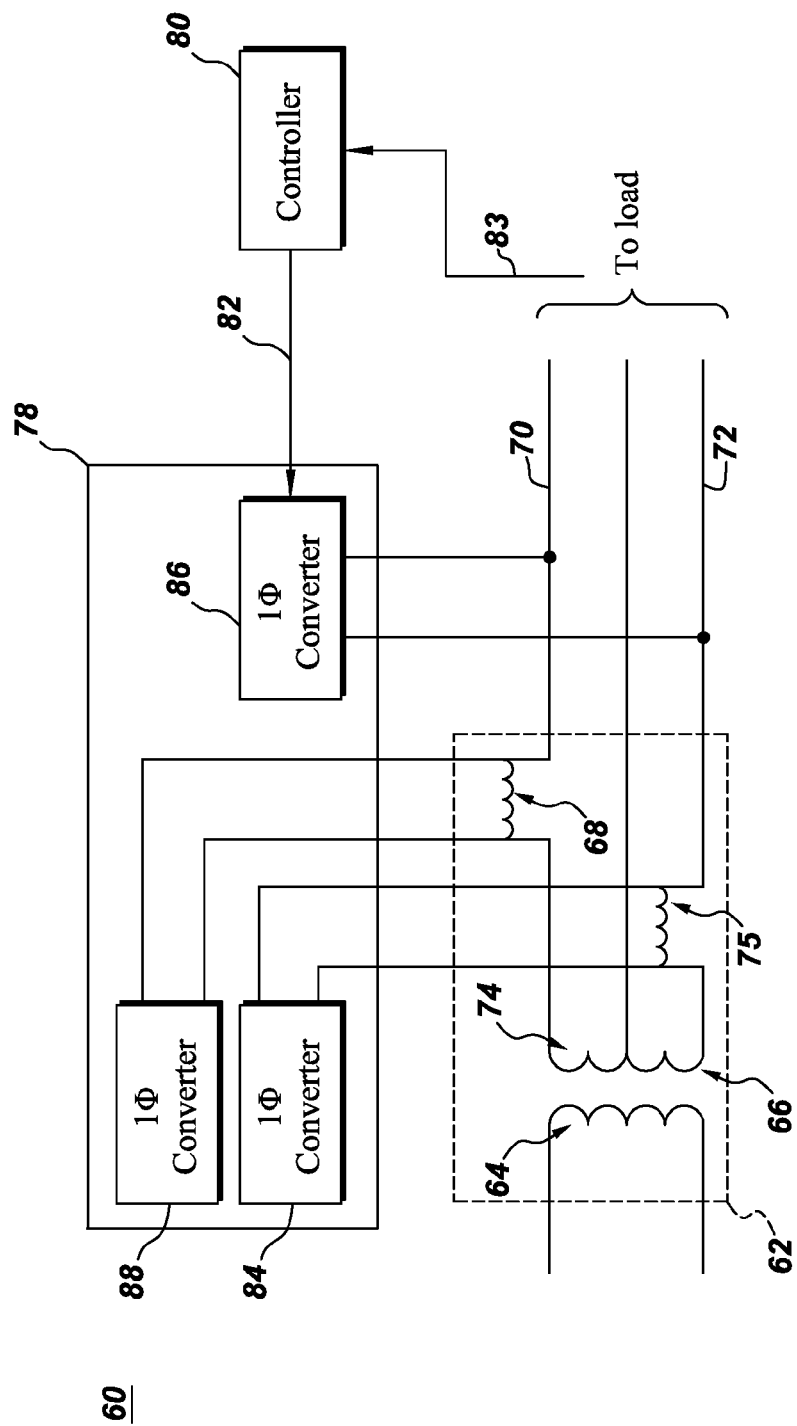
FIG. 3 is a schematic representation of an integrated power quality control system in accordance with an embodiment of the present system.

FIG. 3 shows an integrated power quality control system 60 in accordance with an embodiment of the present technique. Integrated power quality control system 60 includes a distribution transformer 62 having a primary winding 64, a first secondary winding 66, a second secondary winding 74, and a first compensation winding 68 and a second compensation winding 75. In the embodiment shown, there are two compensation windings 68, 75 connected in series with two output terminals 70 and 72 of the secondary winding 66, 74, however, in another embodiment, a single compensation winding may also be utilized. In yet another embodiment, at least one compensation winding may be connected in series with primary winding 64.

In one embodiment, compensation windings 68, 75 share a magnetic core with distribution transformer 62 i.e., compensation windings 68, 75 are wound on the same core as primary winding 64 and secondary winding 66 and 74. The advantage of utilizing a common magnetic core is a space reduction and cost reduction for cooling and packaging of compensation windings 68, 75. A power electronic converter 78 controls voltage across compensation windings 68, 75 based on a reference control voltage signal 82 resulting into control of a magnetic flux in the magnetic core and thus, voltage across secondary windings 66, 74 is controlled. The reference control voltage signal 82 is generated by a controller 80 and is based on a feedback signal 83 from output terminals of distribution transformer 62. In one embodiment, the feedback signal 83 may be a combination of voltage signals or current signals or combinations thereof obtained by voltage and/or current sensors (not shown).

In one embodiment, power electronic converter 78 includes single phase converters 88 and 84 coupled to compensation windings 68, 74 respectively to control voltage across compensation windings 68, 74. Furthermore, power electronic converter 78 may include another single phase converter 86 to charge a common direct current (DC) link (not shown) for all single phase converters 88, 84 and 86. Single phase converter 86 charges the common DC link by fetching active power from transformer 62. In one embodiment, to fetch active power from transformer 62 single phase converter 86 injects appropriate current at output terminals 70, 72. In one embodiment, single phase converters 88, 84 and 86 may be bidirectional converters i.e., converters which convert power from alternating current (AC) to direct current (DC) and/or DC to AC.

In general, all converters 88, 84 and 86 are bidirectional, have a common DC link and exchange real or active power with distribution transformer 62. More often single phase converters 88 and 84 supply active power to distribution transformer 62 which results in discharging of the common DC link and then single phase converter 86 receives active power from distribution transformer 62 to charge the DC link back to its original stage.

Figure 4A:
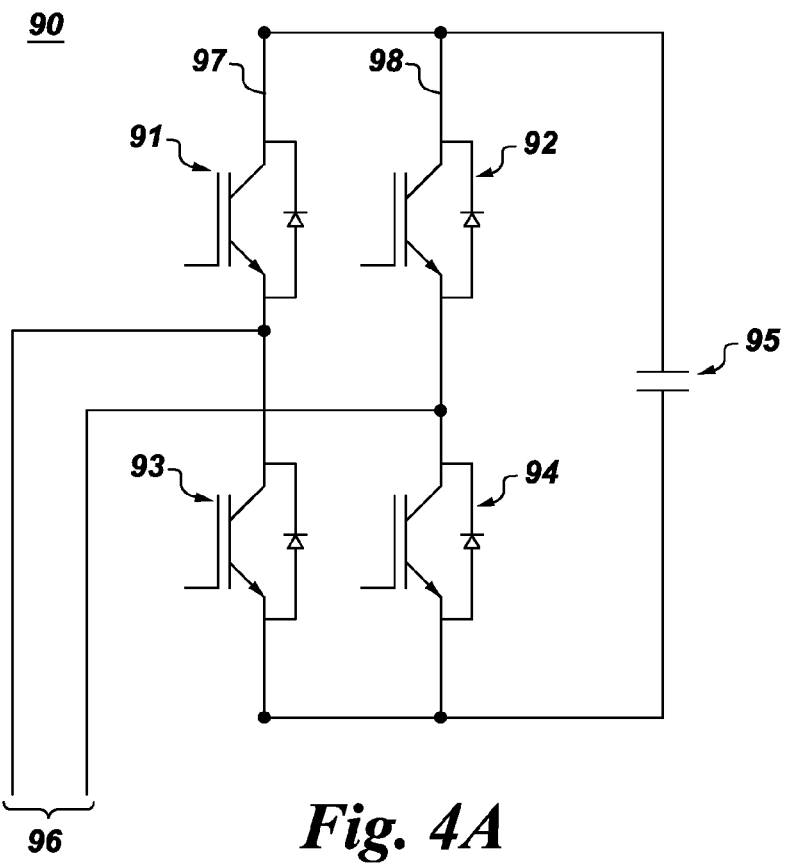
FIGS. 4a and 4b are schematic representation of two exemplary single phase converters utilized in a power electronic converter of FIG. 3 in accordance with embodiments of the present system.
Figure 4B:
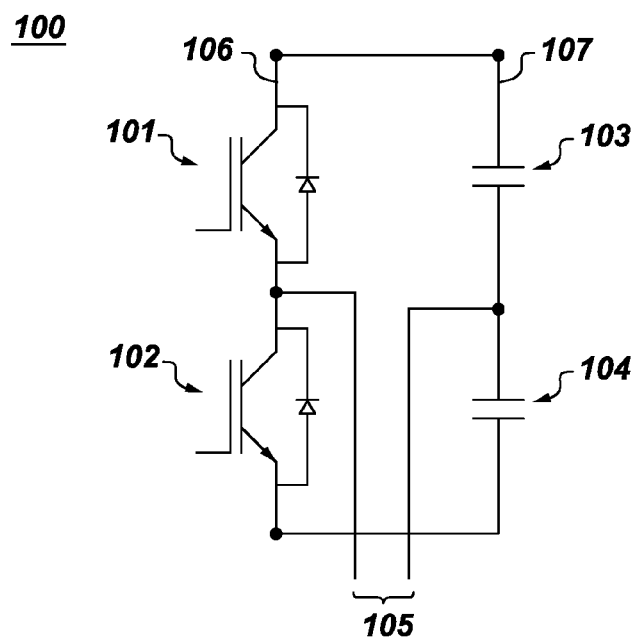

FIG. 4a and FIG. 4b shows two exemplary single phase converters 90, 100 utilized in power electronic converters such as the power electronic converter 78 of FIG. 3. Single phase converter 90 is a full bridge network made up of two parallel connected legs 97, 98 each having semiconductor devices 91, 92, and 93, 94 connected in series respectively. A DC link 95 is connected in parallel with the two legs 97, 98. An output connection 96 of single phase converter 90 is taken at mid-points of both legs 97, 98. Semiconductor devices may include insulated gate bipolar transistors (IGBTs) or metal oxide field effect transistors (MOSFETs).

Referring to FIG. 4b, single phase converter 100 is a half bridge network made up of a split DC link 107 connected in parallel with a power converter leg 106. Power converter leg 106 includes two semiconductor devices 101 and 102 connected in series and split DC link 107 includes two DC link capacitors 103, 104 connected in series. An output connection 105 of single phase converter 100 is taken at mid-points of power converter leg 106 and split DC link 107. As discussed herein any of these single phase converter 90, 100 may be connected across the compensation windings to control its voltage or connected across two power terminals of a transformer to charge the DC link. Furthermore, other embodiments of single phase converters that occur to one skilled in the art are also within the scope of the system.

Figure 5:
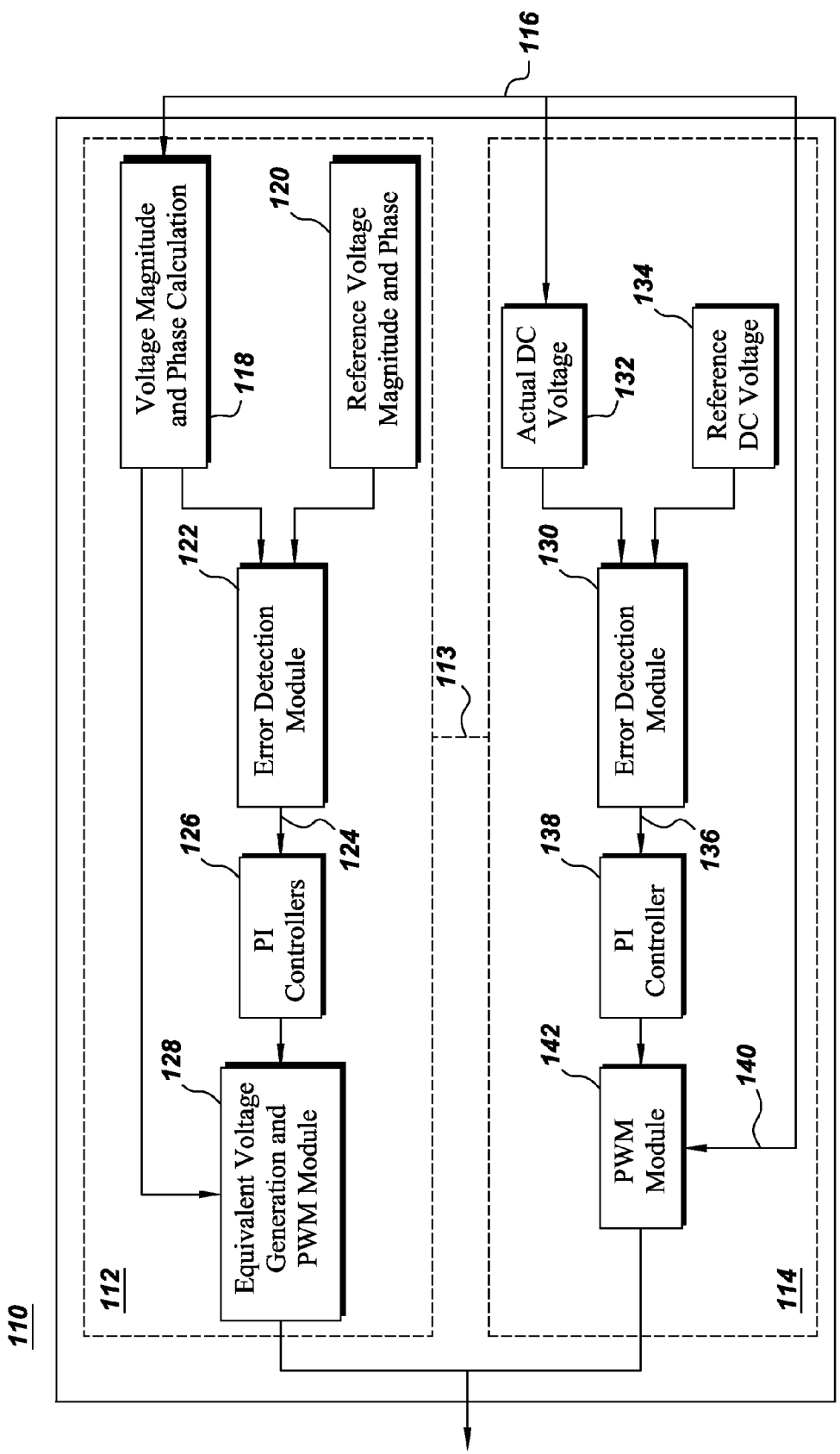
FIG. 5 is a block diagram representation of a controller for power electronic converters in accordance with an embodiment of the present system.

FIG. 5 shows a controller 110 for power electronic converters of FIG. 4 in accordance with embodiments of the present technique. In the embodiment shown, controller 110 includes compensation winding sub-controller 112 for single phase converter (82 or 84 of FIG. 3) which controls voltage across the compensation winding and DC link sub-controller 114 for single phase converter 86 (FIG. 3) which controls the DC link. In one embodiment, where two compensation windings are utilized in the distribution transformer, two compensation winding sub-controllers 112 may be used. Controller 110 receives feedback signals 116 such as output voltage and output current at each of the terminal of the distribution transformer 62 and a DC link voltage magnitude from power electronic converter 78.

Compensation winding sub-controller 112 in this example includes a voltage magnitude and phase calculation module 118 which determines a magnitude and a phase of output voltage of distribution transformer 62. An error detection module 122 compares the magnitude and the phase of output voltage of distribution transformer 62 with a reference voltage magnitude and phase 120 to determine error signals 124. Error signals are then fed to proportional-integral (PI) controllers 126 which, based on error signals, determine magnitude and phase for a series voltage that are added to output voltage to obtain the reference voltage and reduce the error signal to approximately zero. An equivalent voltage generation and pulse width modulation (PWM) module 128 then generates PWM pulses for single phase converter 88 or 84. In one embodiment, turns ratio between the compensation winding and the secondary winding are also taken into consideration for generating the PWM pulses as discussed herein.

For illustrative purposes, voltage ratio between two windings of a transformer can be given as V1/V2=N1/N2, where V1 and V2 are voltages across transformer windings with number of turns equal to N1 and N2 respectively. Assume a transformer secondary winding voltage is V2 (No center tap) and turns ratio N1/N2 between primary winding and secondary winding is 30/1 and turns ratio N3/N2 between compensation winding and secondary winding is 3/1. In one embodiment, V2 is set to be equal to 120 volts (i.e., V1=3600 volts), however, when measured V2 is actually 110 volts (i.e., V1=3300 volts). This suggests that a series voltage Vser of 10 volts need to be added in V2 to make it equal to the reference value which is 120 volts. In this case, voltage V2 can be adjusted by 10 volts by either increasing V1 by 300 volts or making V3 equal to 30 volts. Thus, equivalent voltage generation and PWM module 128 first calculates V3 from Vser determined by PI controllers 126 and then generates PWM pulses for single phase converter 88 or 84.

The reference voltage magnitude and phase 120 is determined based on a power quality control requirement and is determined by the system operator or by another small controller (not shown). The power quality control requirement includes one of a voltage regulation, power factor correction, harmonic distortion compensation, and reactive power compensation. For example, if the power quality control requirement is voltage regulation, then the reference output voltage may be fed into the system by the operator and the reference voltage that needs to be injected may be determined by vector subtraction of the reference output voltage and the measured distribution transformer output voltage (i.e., Vser=Vref−V2). However, if the power quality control requirement is reactive power compensation, then a second controller may determine actual reactive power and compare it with reference reactive power to find out the reference voltage magnitude and phase. Similarly a second controller may be utilized for generating the reference voltage magnitude and phase in case of a harmonic compensation requirement.

DC link sub-controller 114 includes an error detection module 130 which determines difference between actual DC voltage 132 and a reference DC voltage 134 and provides an error signal 136 to a PI controller 138. PI controller 138 then determines a magnitude or amplitude modulation ratio for a PWM module 142 which then generates PWM pulses for single phase converter 86.

It should be noted that in FIG. 5, only an example controller is shown. However, other controllers to control voltage across the compensation winding or to control the DC link voltage and modification to the controller disclosed herein are within the scope of the present system. For example, in an embodiment (e.g., in case of a fault), compensation winding sub-controller 112 and DC link sub-controller 114 may be coupled as shown by a dotted line 113 and there may cross couple of some components.

Figure 6:
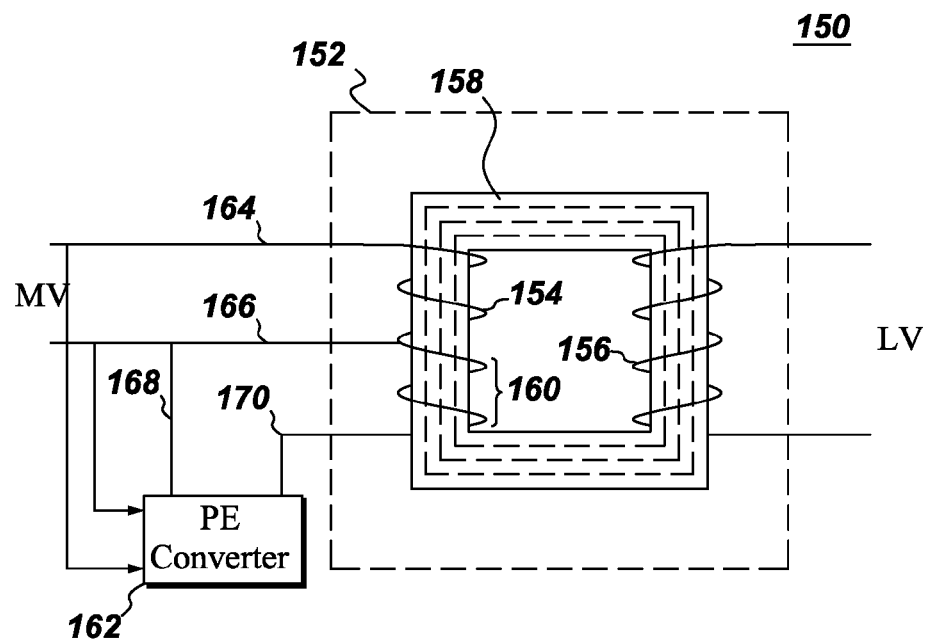
FIG. 6 is a schematic representation of one embodiment of the integrated power quality control system in accordance with an embodiment of the present system.

FIG. 6 shows a schematic diagram of one embodiment of the integrated power quality control system 150. Integrated power quality control system 150 includes a transformer 152 having a primary winding 154 and a secondary winding 156 wound on a magnetic core 158. A compensation winding 160 is further wound on magnetic core 158 in continuation to primary winding 154. A power electronic converter 162 is connected in parallel across two input terminals 164, 166 of primary winding 154 and is controlled to receive active power from input terminals 164, 166 to charge a DC link as discussed herein. Output terminals 168, 170 of power electronic converter 162 are further connected across compensation winding 160. A controller (not shown) controls output voltage of power electronic converter 162 and accordingly changes voltage across compensation winding 160. As the voltage across compensation winding 160 changes, it changes a magnetic flux in transformer and accordingly it changes voltage across secondary winding 156. This technique can also be referred to as magnetic series compensation as a magnetic flux due to primary winding and a magnetic flux due to compensation windings get added for resultant magnetic flux in the transformer which changes the output voltage across secondary winding 156. Thus, instead of addition of voltages, the two magnetic fluxes get added which results in change in the output voltage.

Figure 7:
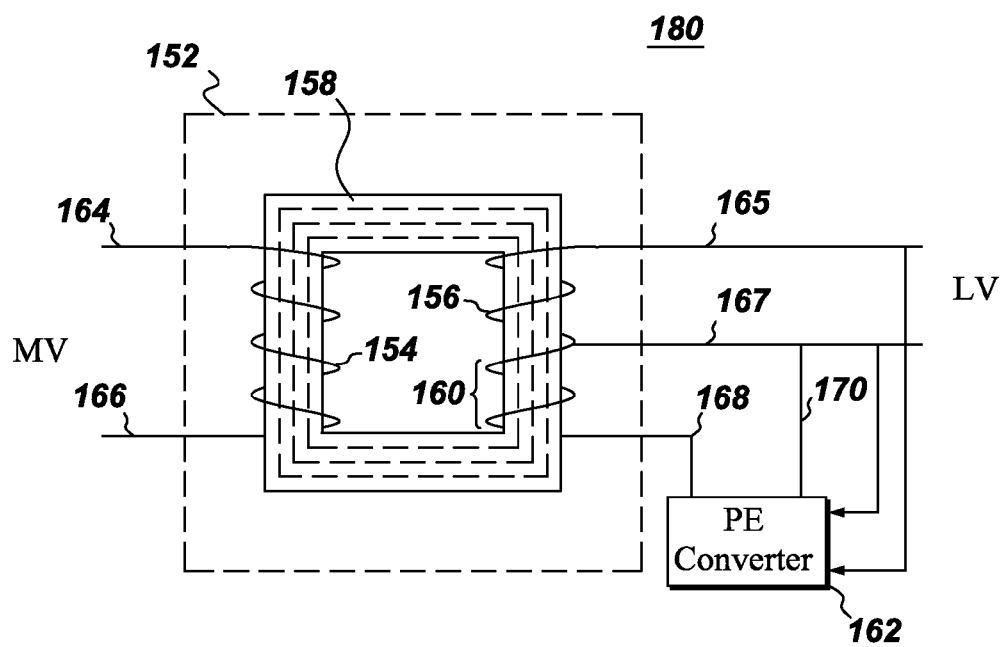
FIG. 7 is a schematic diagram of another embodiment of the integrated power quality control system in accordance with an embodiment of the present system.

FIG. 7 shows a schematic diagram of another embodiment of an integrated power quality control system 180. In this embodiment 180, the main difference compared to embodiment 150 of FIG. 6 is that compensation winding 160 is now connected in series with secondary winding 156 rather than in series with primary winding 154. Furthermore, power electronic converter input connections are connected in parallel to output terminals 165, 167 of secondary winding 156 and power electronic converter output connections 168, 170 are connected across compensation winding 160.

Figure 8:
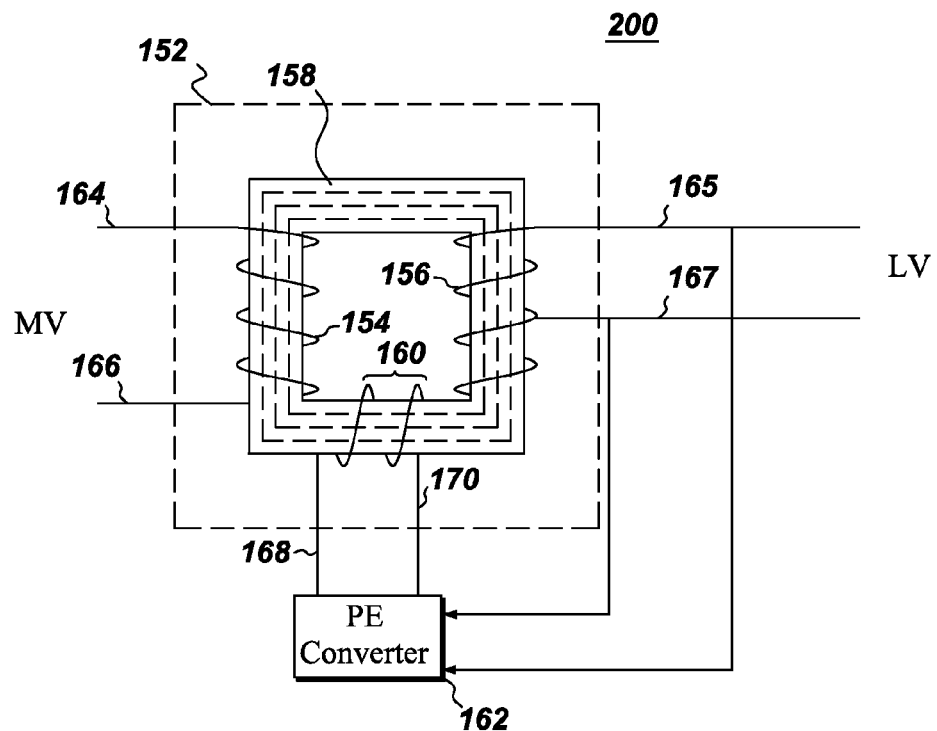
FIG. 8 is a schematic representation of yet another embodiment of the integrated power quality control system in accordance with an embodiment of the present system.

FIG. 8 shows yet another embodiment of an integrated power quality control system 200. In embodiment 200, compensation winding 160 is neither connected in series with primary winding 154 nor in series with secondary winding 156 rather it is wound separately on magnetic core 158. The control of power electronic converter 162 in both embodiments 180 and 200 is similar to the control discussed herein.

Figure 9:
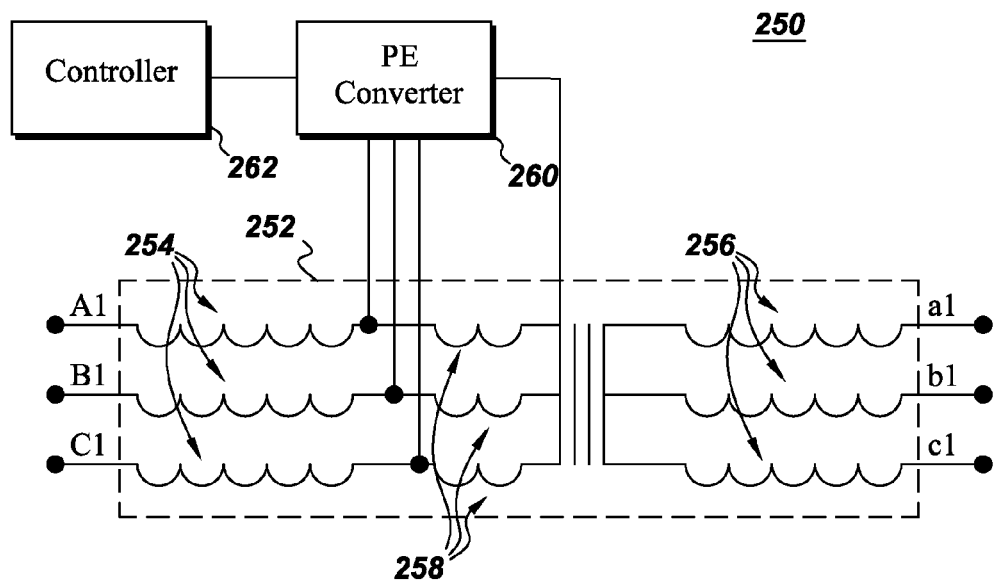
FIG. 9 is a schematic representation of an embodiment of a three phase integrated power quality control system in accordance with an embodiment of the present system.

FIG. 9 shows a schematic representation of a three phase integrated power quality control system 250 in accordance with an embodiment of the present system. In general, in this embodiment, compensation windings discussed herein may also be employed in a three phase transformer. Thus, three phase integrated power quality control system 250 includes a three phase transformer 252 with primary windings 254 and secondary windings 256. Terminals A1, B1, and C1 form input terminals of transformer 252 whereas terminals a1, b1 and c1 form output terminals of transformer 252. Compensation windings 258 are connected in series with primary windings 254, however, in another embodiment, compensation windings 258 may also be connected in series with secondary windings 256. A power electronic converter 260 which may include a three phase converter that controls voltage across compensation windings 258 based on input signals from controller 262.

Advantages of the present system and technical advantages include stable feeder voltage supply to loads, whether residential, business or government, improved power quality, no requirement of breaking the feeder lines and optimized size and cost of the system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An integrated power quality control system, comprising:
a transformer including a primary winding, at least one secondary winding and at least one compensation winding wound on a magnetic core;
a power electronic converter providing a reference voltage to the compensation winding for injecting a series voltage in the at least one secondary winding; and
a controller to generate a reference control voltage for the power electronic converter based on a power quality control requirement;
wherein the controller generates the reference control voltage based on a relationship between a turns ratio of the at least one compensation winding and the secondary winding, and a reference secondary winding voltage determined based on the power quality control requirement.

2. The integrated power quality control system of claim 1, wherein the at least one compensation winding is connected in series with the primary winding or the at least one secondary winding or is wound separately on the magnetic core.

3. The integrated power quality control system of claim 1, wherein the at least one compensation winding is configured to control a magnetic flux in the magnetic core for injecting the series voltage in the at least one secondary winding.

4. The integrated power quality control system of claim 1, wherein the power electronic converter comprises a plurality of bidirectional converters utilizing a common DC link or a three phase converter.

5. The integrated power quality control system of claim 4, wherein at least one of the plurality of the bidirectional converters is connected across the primary winding or the at least one secondary winding.

6. The integrated power quality control system of claim 1, wherein the transformer comprises a three phase transformer or a single phase transformer or a split phase secondary transformer.

7. The integrated power quality control system of claim 4, wherein the plurality of the bidirectional converters include a DC to AC converter to control the reference voltage across the at least one compensation winding and a AC to DC converter for charging the common DC link by exchanging active power with the transformer.

8. The integrated power quality control system of claim 7, wherein the controller includes a first controller to control the DC to AC converter and a second controller to control the AC to DC converter.

9. The integrated power quality control system of claim 8, wherein the second controller is configured to generate an amplitude modulation ratio for generating PWM pulses for the AC to DC converter based on an error between a reference DC voltage and an actual DC voltage.

10. The integrated power quality control system of claim 8, wherein the first controller includes a voltage magnitude and phase calculation module to determine a magnitude and a phase of a secondary winding voltage.

11. The integrated power quality control system of claim 10, wherein the first controller includes an error detection module to generate an error signal based on comparison of the magnitude and the phase of the secondary winding voltage with a magnitude and a phase of the reference secondary winding voltage.

12. The integrated power quality control system of claim 11, wherein the first controller includes proportional-integral (PI) controllers configured to reduce the error signal to zero.

13. The integrated power quality control system of claim 1, wherein the power quality control requirement includes one of a voltage regulation, power factor correction, harmonic distortion compensation, and reactive power compensation.

14. A method of controlling power to a load, comprising:
providing a transformer including a primary winding, at least one secondary winding and at least one compensation winding wound on a magnetic core;
generating a reference control voltage for a power electronic converter based on a power quality control requirement; and
utilizing the power electronic converter to provide a reference voltage across the compensation winding for injecting a series voltage in the at least one secondary winding;
wherein the reference control voltage is generated based on a relationship between a turns ratio of the at least one compensation winding and the at least one secondary winding, and a reference secondary winding voltage determined based on the power quality control requirement.

15. The method of controlling power to the load of claim 14, wherein providing a transformer comprises connecting the at least one compensation winding in series with the primary winding or the at least one secondary winding or is wound separately on the magnetic core.

16. The method of controlling power to the load of claim 14, wherein injecting the series voltage in the at least one secondary winding comprises controlling a magnetic flux in the magnetic core.

17. The method of controlling power to the load of claim 14, wherein the power quality control requirement includes at least one of a voltage regulation, power factor correction, harmonic distortion compensation, and reactive power compensation.

18. The method of controlling power to the load of claim 14, wherein utilizing the power electronic converter comprises utilizing at least one bidirectional converter with a common DC link.

19. The method of controlling power to the load of claim 18, wherein utilizing the bidirectional converter includes utilizing a DC to AC converter to control the reference voltage across the at least one compensation winding and a AC to DC converter for charging the common DC link by exchanging active power with the transformer.

* * * * *